United States Patent
Kocher et al.

(10) Patent No.: US 7,127,979 B2
(45) Date of Patent: Oct. 31, 2006

(54) SAW BLADE FOR HAND-HELD TOOLS

(75) Inventors: Martin Kocher, Solothurn (CH); Daniel Grolimund, Zuchwil (CH)

(73) Assignee: Robert Bosch GmbH, Stuttgart (DE)

( * ) Notice: Subject to any disclaimer, the term of this patent is extended or adjusted under 35 U.S.C. 154(b) by 453 days.

(21) Appl. No.: 10/070,710

(22) PCT Filed: Apr. 14, 2001

(86) PCT No.: PCT/DE01/01468

§ 371 (c)(1),
(2), (4) Date: Mar. 12, 2002

(87) PCT Pub. No.: WO02/11934

PCT Pub. Date: Feb. 14, 2002

(65) Prior Publication Data
US 2002/0121023 A1    Sep. 5, 2002

(30) Foreign Application Priority Data
Aug. 3, 2000 (DE) .................. 100 37 809

(51) Int. Cl.
*B27B 33/02* (2006.01)
(52) U.S. Cl. .............. 83/848; 83/835; 83/846
(58) Field of Classification Search ........ 83/835, 83/846, 848, 851, 852, 697; 30/392, 501, 30/502, 503, 503.5
See application file for complete search history.

(56) References Cited

U.S. PATENT DOCUMENTS

| 964,602 | A | | 7/1910 | Aldridge | |
|---|---|---|---|---|---|
| 2,633,880 | A | * | 4/1953 | Mattson | 144/34.1 |
| 2,994,350 | A | * | 8/1961 | Lundberg | 83/845 |
| 3,292,674 | A | * | 12/1966 | Turner | 83/848 |
| 3,792,524 | A | * | 2/1974 | Pomernacki | 407/1 |
| 4,011,783 | A | * | 3/1977 | Mobley | 83/846 |
| 4,157,673 | A | * | 6/1979 | Bruno | 83/837 |
| RE31,433 | E | * | 11/1983 | Clark | 83/846 |
| 4,958,546 | A | * | 9/1990 | Yoshida et al. | 83/848 |
| 5,062,338 | A | * | 11/1991 | Baker | 83/848 |
| 5,331,876 | A | * | 7/1994 | Hayden, Sr. | 83/661 |
| 5,410,935 | A | * | 5/1995 | Holston et al. | 83/851 |
| 5,477,763 | A | * | 12/1995 | Kullman | 83/846 |
| 5,606,900 | A | * | 3/1997 | Stoddard | 83/846 |
| 6,276,249 | B1 | * | 8/2001 | Handschuh et al. | 83/851 |
| 6,439,094 | B1 | * | 8/2002 | Yoneda et al. | 83/835 |

FOREIGN PATENT DOCUMENTS

DE    27 53 509    7/1978
GB    211 098    10/1924

* cited by examiner

Primary Examiner—Boyer D. Ashley
Assistant Examiner—Laura M. Brean
(74) Attorney, Agent, or Firm—Michael J. Striker

(57) ABSTRACT

A saw blade for power tools, in particular for power reciprocating saws, includes a blade back (11) and a toothing (12) extending along the lower edge of the blade back and having many saw teeth (13) lined up in succession, In order to increase the blade life and service life of the saw blade, especially in a Thick, stable embodiment, the saw teeth (13) in successive portions (a, b) of the toothing (12) have the same tooth width ($a_z$, $b_z$), which, however, differs from that of the saw teeth (13) in the preceding or the succeeding portion (b, a) of the toothing (12).

1 Claim, 2 Drawing Sheets

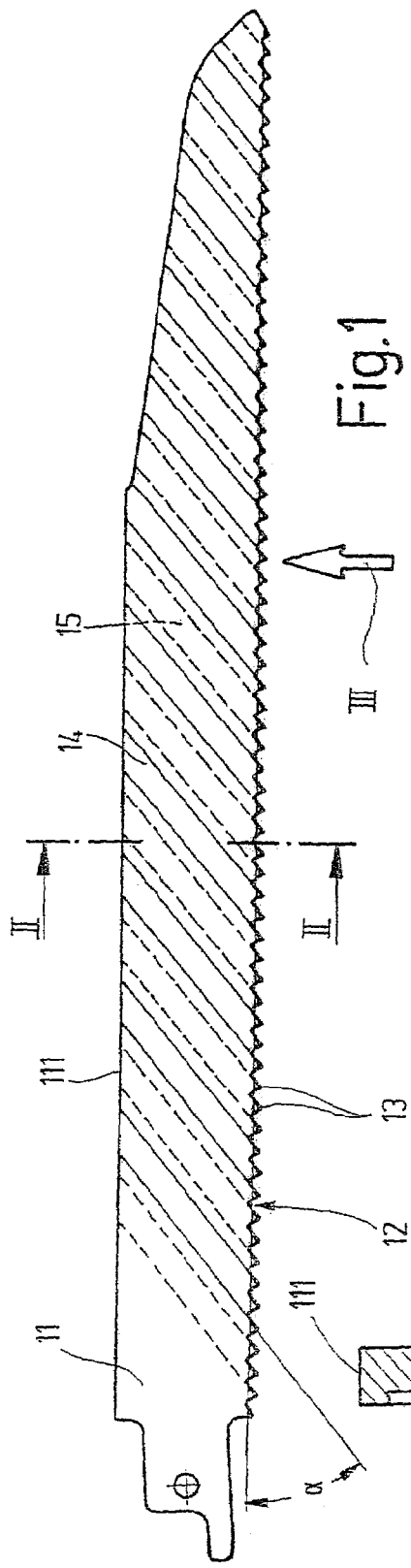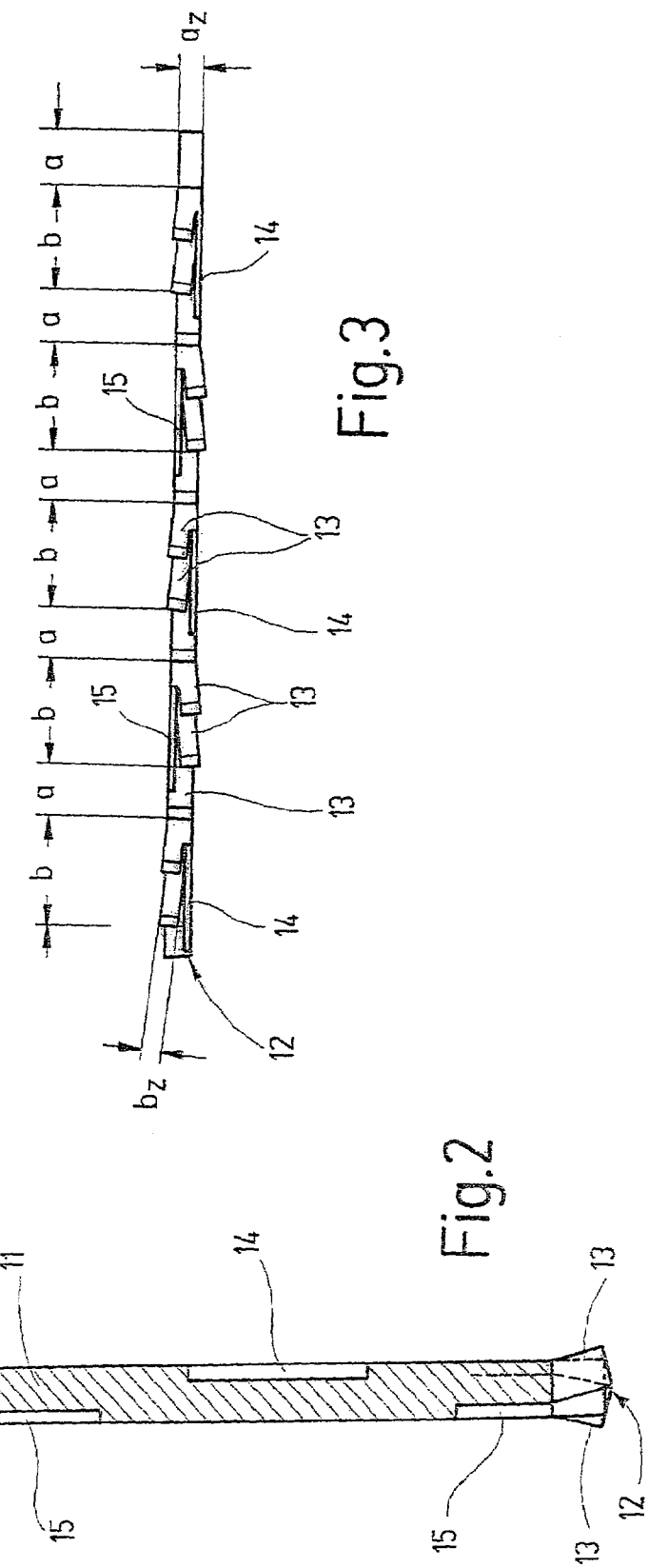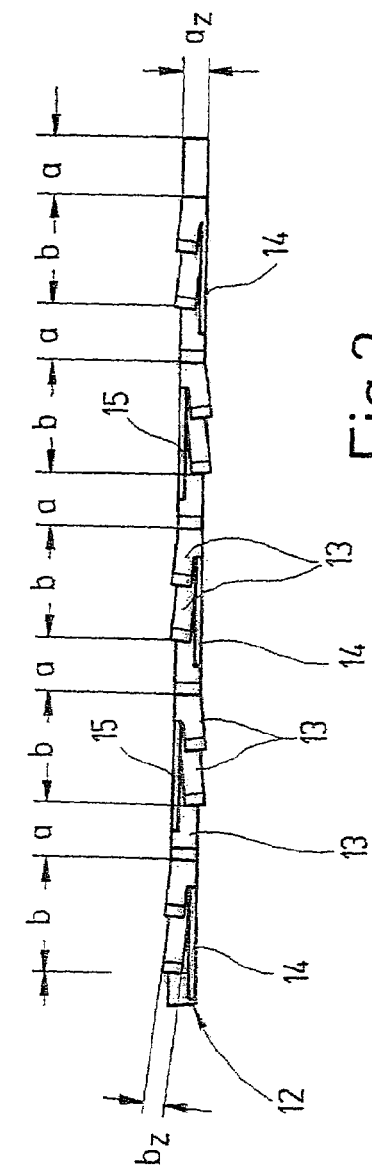

SAW BLADE FOR HAND-HELD TOOLS

BACKGROUND OF THE INVENTION

The invention relates to a saw blade for power tools, in particular for power reciprocating saws, such as saber or piercing saws.

Known saw blades of this type have the same tooth width over the length of the teeth, and this tooth width is dictated by the thickness of the saw blade. For free-cutting of the saw blade, the saw teeth are transposed in the workpiece, so that the tooth tips protrude laterally slightly past the contour of the blade back in alternation. For rough, heavy-duty use, stable saw blades up to 1.6 mm thick are used, but with increasing saw blade thickness the blade life and the service life of the saw blades decrease.

SUMMARY OF THE INVENTION

The saw blade of the invention has the advantage that by the partial reduction of individual saw teeth, or pairs or groups of saw teeth, a very good blade life and service life of the saw blade are attained despite a thick, stable saw blade. The cutting forces are optimized, and the heat production at the saw blade during sawing is reduced.

By the provisions recited in the other claims, advantageous refinements of and improvements to the saw blade defined by claim 1 are possible.

In one advantageous embodiment of the invention, the tooth width of the saw teeth in one set of portions of the toothing is equivalent to the thickness of the blade back, and the tooth width differing from it of the saw teeth in the other portions of the toothing is brought about by material removal or material compacting, such as swaging. To that end, recesses spaced apart from one another are made in the blade back on both sides of the blade back and extend past the saw teeth as far as the underside, remote from the blade back, of the teeth, and the recesses on one side of the blade back and the recesses on the other side of the blade back are disposed offset from one another longitudinally of the saw blade.

In alternative embodiments of the invention, the recesses are extended as far as the upper edge, remote from the teeth, of the blade back, or they end at a distance in front of this upper edge.

In an advantageous embodiment of the invention, the recesses are inclined relative to the teeth at an acute angle in the advancement direction of the saw blade, and preferably the acute angle is equivalent to the rake angle of the saw teeth. Because of the oblique edges of the channels formed by the recesses, an additional advancement force against the workpiece ensues, because of the frictional forces.

BRIEF DESCRIPTION OF THE DRAWINGS

The invention is explained in further detail in the ensuing description in terms of exemplary embodiments shown in the drawing. Shown are:

FIG. 1, a side view of a saw blade for a power reciprocating saw;

FIG. 2, a section take along the line II—II in FIG. 1, shown enlarged;

FIG. 3, a fragmentary view from below of the saw blade in the direction III in FIG. 1, shown enlarged;

DETAILED DESCRIPTION OF THE PREFERRED EMBODIMENTS

Figure 4:
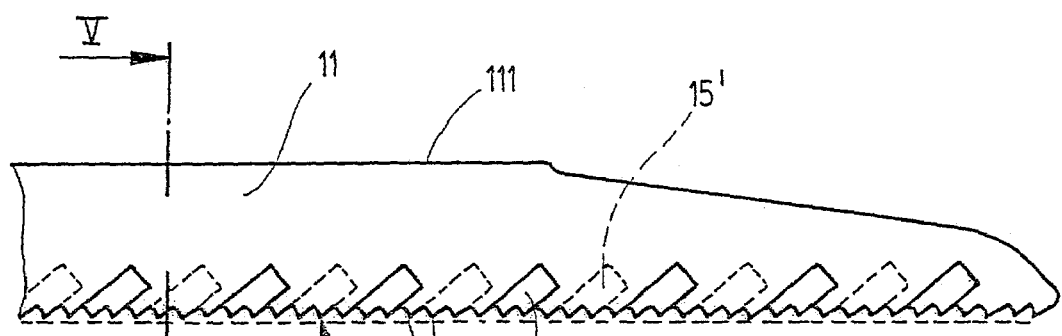
FIG. 4, a fragmentary side view of a saw blade in a further exemplary embodiment.

The saw blade for a power reciprocating saw (saber saw, piercing saw or the like) shown in side view in FIG. 1, as an exemplary embodiment for a power tool in general, has a blade back 11 and a toothing 12, extending along the lower edge of the blade back and comprising many saw teeth 13 lined up in succession. In successive portions a and b (FIG. 3) of the toothing 12, each with an integral number of saw teeth 13, the saw teeth 13 are embodied with the same tooth width $a_z$ or $b_z$, which however differs from that of the saw teeth 13 in the preceding or succeeding portion b or a, respectively. In the exemplary embodiment of FIGS. 1–3, the portions a of the toothing 12 each include one saw tooth, while the portions b of the toothing 12 each include two saw teeth 13. The tooth width $a_z$ of the saw teeth 13 in the portions a is equivalent to the thickness of the blade back 11, while the tooth width $b_z$ of the saw teeth 13 in the portions b by comparison is smaller and is brought about by material removal or material compacting. The material removal or material compacting is done in alternation from one side and the other of the blade back 11 in successive portions b of the toothing 12 that have the saw teeth 13 with the reduced tooth width $b_z$. To that end, on both sides of the blade back 11, recesses 14 and 15 spaced apart equally from one another are made; they extend past the saw teeth 13 as far as the underside of the toothing 12, remote from the blade back 11. The recesses 14 on one side of the blade back 11 are offset longitudinally of the saw blade from the recesses 15 on the other side of the blade back 11.

In the exemplary embodiment of the saw blade of FIGS. 1–3, the recesses 14 and 15 extend as far as the upper edge 111, remote from the toothing 12, of the blade back 11 and are inclined in the advancement direction of the saw blade by an acute angle α (FIG. 1) compared to the toothing 12. The angel α is equivalent to the rake angle of the saw teeth 13.

Once the recesses 14, 15 have been made in order to reduce the saw teeth 13 to the tooth width $b_z$, the saw teeth 13 with the reduced tooth width $b_z$ in each portion b of the teeth are transposed; the transposition is done from the side of the blade back 11 remote from the respective recess 14 and 15. Overall, the saw teeth in successive portions b of the toothing 12 are thus transposed in opposite directions. The saw tooth 13 that is present in the portions a of the toothing 12, having the tooth width $a_z$, is not transposed and is flush with the lateral contours of the blade back 11.

Figure 5:
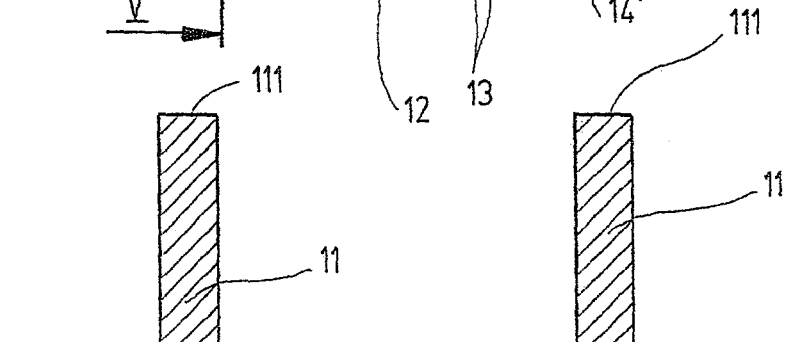
FIG. 5, a section taken along the line V—V of FIG. 4, shown enlarged.

The second exemplary embodiment of the saw blade, shown in FIGS. 4 and 5, differs from the saw blade described above only in that recesses 14', 15' that reduce the saw teeth 13 to the tooth width $b_z$ in both sides, remote from one another, of the blade back 11 do not extend over the full height of the blade back 11 but instead end at a relatively great distance before the upper edge 111 of the blade back 11. The recesses 14', 15' are again inclined relative to the toothing 12, and the direction of inclination and the angle of inclination are selected as in FIG. 1.

Figure 7:
FIG. 7, a section taken along the line VII—VII of FIG. 6, shown enlarged.
Figure 6:
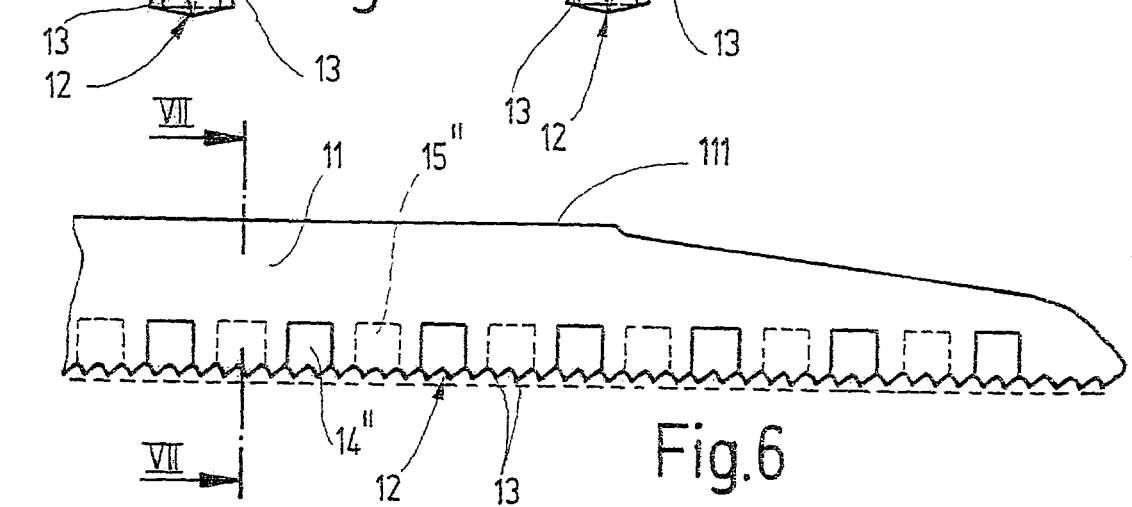
FIG. 6, a fragmentary side view of a saw blade in a third exemplary embodiment.

In the third exemplary embodiment of a saw blade, in FIGS. 6 and 7, the recesses 14" and 15" on both sides of the blade back 11 again end at a great distance from the upper edge 111 of the blade back 11. The recesses 14″ and 15″, which as in the two exemplary embodiments described above are disposed equidistantly in the same way, now however extend at a right angle to the longitudinal direction of the toothing 12. Once again, the recesses 14″ on one side of the blade back 11, which are spaced equally apart from one another, are offset from the recesses 15″ on the other side of the blade back 11, which are also spaced equally apart from one another; the offset corresponds to half the spacing between the recesses 14 and between the recesses 15″.

The invention is not limited to the exemplary embodiments described for the saw blade. For instance, in the portions a and b of the toothing 12, there can be more than one and two saw teeth 13, respectively. Nor is it compulsory that all the portions a and/or b of the toothing 12 each include the same number of saw teeth 13. Instead, the number of saw teeth can vary within the portions a and/or with the portions b. The recesses 14 and 15 that are associated with the portions b of the teeth must then be varied accordingly in their width.

The saw blade need not necessarily be embodied as a saw blade that can be fastened on one side in a power recipro- cating saw. It can also be provided with fastening means on both ends of the blade for reception in a power coping saw, as a further exemplary embodiment of a power tool.

The invention claimed is:

1. A saw blade for power tools, comprising a blade back and a toothing, said toothing extending along a lower edge of the blade back, and including many saw teeth lined up in succession, wherein in successive portions of the toothing, each with an integral number of saw teeth, the saw teeth have the same tooth width, as measured at a top-cutting edge in a direction of a thickness of the saw blade, wherein said same tooth width is different from the saw teeth in the preceding or succeeding portion of the toothing, wherein parallel recesses spaced apart from one another are formed in the blade back on both sides of the blade back and extend past the saw teeth as far as an underside of the toothing remote from the blade back, and wherein the recesses on one side of the blade back and the recesses on another side of the blade back are disposed offset from one another longitudinally of the saw blade, and wherein the recesses extend as far as an upper edge of the blade back remote from the toothing.

* * * * *